(12) United States Patent
Childers

(10) Patent No.: US 8,355,854 B2
(45) Date of Patent: Jan. 15, 2013

(54) METHODS RELATING TO GAS TURBINE CONTROL AND OPERATION

(75) Inventor: Scott A. Childers, Greenville, SC (US)

(73) Assignee: General Electric Company, Schenectady, NY (US)

( * ) Notice: Subject to any disclaimer, the term of this patent is extended or adjusted under 35 U.S.C. 154(b) by 685 days.

(21) Appl. No.: 12/437,730

(22) Filed: May 8, 2009

(65) Prior Publication Data

US 2010/0286889 A1    Nov. 11, 2010

(51) Int. Cl.
  *F02C 6/04*    (2006.01)
(52) U.S. Cl. .............................. 701/100; 701/99; 60/784
(58) Field of Classification Search .................. 701/100, 701/99; 60/784
  See application file for complete search history.

(56) References Cited

U.S. PATENT DOCUMENTS

| | | | | |
|---|---|---|---|---|
| 5,857,321 | A * | 1/1999 | Rajamani et al. | 60/39.27 |
| 6,385,958 | B2 * | 5/2002 | Leone et al. | 60/782 |
| 6,393,825 | B1 * | 5/2002 | Leone et al. | 60/782 |
| 6,581,368 | B2 * | 6/2003 | Utamura | 60/39.3 |
| 6,609,360 | B2 * | 8/2003 | Utamura | 60/39.092 |
| 6,796,129 | B2 * | 9/2004 | Yee et al. | 60/777 |
| 2001/0018824 | A1 * | 9/2001 | Leone et al. | 60/39.02 |
| 2007/0151257 | A1 * | 7/2007 | Maier et al. | 60/782 |
| 2009/0113896 | A1 * | 5/2009 | Fukuda | 60/784 |
| 2010/0223903 | A1 * | 9/2010 | Starr | 60/204 |

* cited by examiner

*Primary Examiner* — Lesley D Morris
*Assistant Examiner* — Michael Stabley
(74) *Attorney, Agent, or Firm* — Mark E. Henderson; Ernest G. Cusick; Frank A. Landgraff

(57) ABSTRACT

A method of controlling variable extraction flow in a combustion turbine engine, wherein extraction flow comprises a supply of compressed air extracted from the compressor and supplied to the turbine through extraction conduits, and wherein the extraction conduits includes a variable extraction orifice, the method comprising the steps of: measuring a plurality of turbine engine operating parameters; monitoring, by a control unit, the measured operating parameters of the combustion turbine engine; setting the variable extraction orifices to a setting that allows an approximate maximum level of extraction flow; calculating, by the control unit, at least one calculated operating parameter based upon model-based control and the measured operating parameters, including at least a current turbine inlet temperature and a maximum turbine inlet temperature; and manipulating the setting for the supply of fuel to the combustor such that an increased and/or maximum level of engine output is determined by comparing the values for the current turbine inlet temperature and the maximum turbine inlet temperature.

9 Claims, 6 Drawing Sheets

METHODS RELATING TO GAS TURBINE CONTROL AND OPERATION

BACKGROUND OF THE INVENTION

This present application relates generally to methods, systems, and/or apparatus for improving the efficiency and/or operation of gas turbine engines, which, as used herein and unless specifically stated otherwise, is meant to include all types of gas or combustion turbine or rotary engines, including aircraft engines, power generating engines and others. More specifically, but not by way of limitation, the present application relates to methods, systems, and/or apparatus pertaining to controlling compressor extraction flows during operation to improve engine performance.

In general, gas turbine engines include a compressor, a combustor, and a turbine. The compressor and turbine generally include rows of blades that are axially stacked in stages. Each stage includes a row of circumferentially-spaced stator blades, which are fixed, and a row of rotor blades, which rotate about a central axis or shaft. In operation, generally, the compressor rotor blades rotate about the shaft, and, acting in concert with the stator blades, compress a flow of air. The supply of compressed air then is used in the combustor to combust a supply of fuel. Then, the resulting flow of hot gases from the combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft.

In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electric power is generated. During operation, because of the extreme temperatures of the hot-gas path—which may reach between approximately 2400° to 2600° F.—and high rotational velocities, turbine blades are highly stressed with extreme mechanical and thermal loads. Generally, as one of ordinary skill in the art will appreciate, this requires that gas turbine engines be signed to extract air from the compressor and use the air to cool parts in the hot-gas path during operation. This extraction comes at a price, however, as the usage of compressor air in this manner decreases the efficiency of the turbine engine. Therefore, it should be reduced or minimized whenever possible.

As one of ordinary skill in the art will appreciate, conventional engine design generally employs a one-size-fits-all approach to the extraction of cooling air from the compressor, which means the amount of extraction is fixed. A result of this approach is that often engines extract cooling air from the compressor in excess of the amount needed. Given the performance penalty associated with using excess cooling air and the desire to avoid this penalty to the extent possible during the most common operating conditions, the one-size-fits-all extraction capacity generally is sized smaller than the level that might be needed for certain applications, such as for peak power generation during hot ambient conditions, or larger than that needed for other situations, such as base load operations in colder ambient conditions.

To address this issue, some gas turbine systems use technology that allows for a variable level of extraction from the compressor. However, even where variable extraction is available, convention turbine control methods and systems fail to fully exploit this capability such that attainable increases in output and efficiency are realized. Computer-implemented methods and systems are available that measure and monitor engine operating parameters and, from this data, model the engine system such that other operating parameters may be calculated and used to fine-tune operation. In some instances, as discussed in detail below, this type of technology may be modified (as provided herein) and leveraged such that when paired with variable compressor extraction technology, enhanced engine performance may be achieved. As a result, there is a need for improved apparatus, methods and/or systems relating to the controlling of variable cooling air extraction levels such that greater engine output levels, increased efficiency, and/or other enhanced performance are attainable.

BRIEF DESCRIPTION OF THE INVENTION

The present application thus describes a method of controlling variable extraction flow in a turbine engine that includes a compressor, a combustor and a turbine, wherein extraction flow comprises a supply of compressed air extracted from the compressor and supplied to the turbine while bypassing the combustor through one or more extraction conduits, and wherein at least one of the extraction conduits includes a variable extraction orifice that has a plurality of settings controlled by a control unit, the method comprising the steps of measuring a plurality of turbine engine operating parameters, wherein the measured operating parameters include at least one associated with a temperature within the turbine, one associated with the setting of the variable extraction orifice, one associated with a pressure within the compressor, one associated with the pressure within one of the extraction conduits, and one associated with the level of extraction flow; monitoring, by the control unit, the measured operating parameters of the combustion turbine engine; calculating, by the control unit, at least one calculated operating parameter based upon model-based control and the measured operating parameters, including at least a measured critical pressure ratio; and manipulating the setting for at least one of the variable extraction orifices such that a decreased and/or minimum extraction flow is determined by comparing whether the measured critical pressure ratio exceeds a scheduled critical pressure ratio.

The present application further describes a method of controlling variable extraction flow in a turbine engine that includes a compressor, a combustor and a turbine, wherein extraction flow comprises a supply of compressed air extracted from the compressor and supplied to the turbine while bypassing the combustor through one or more extraction conduits, and wherein at least one of the extraction conduits includes a variable extraction orifice that has a plurality of settings controlled by a control unit, the method comprising the steps of: measuring a plurality of turbine engine operating parameters, wherein the measured operating parameters include at least one associated with a temperature within the turbine, one associated with the setting of the variable extraction orifice, one associated with the level of extraction flow; one associated with a supply of fuel to the combustor; monitoring, by the control unit, the measured operating parameters of the combustion turbine engine; setting at least one variable extraction orifice to a setting that allows an approximate maximum level of extraction flow; calculating, by the control unit, at least one calculated operating parameter based upon model-based control and the measured operating parameters, including at least a current turbine inlet temperature and a maximum turbine inlet temperature; and manipulating the setting for the supply of fuel to the combustor such that an increased and/or maximum level of engine output is determined by comparing the values for the current turbine inlet temperature and the maximum turbine inlet temperature.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
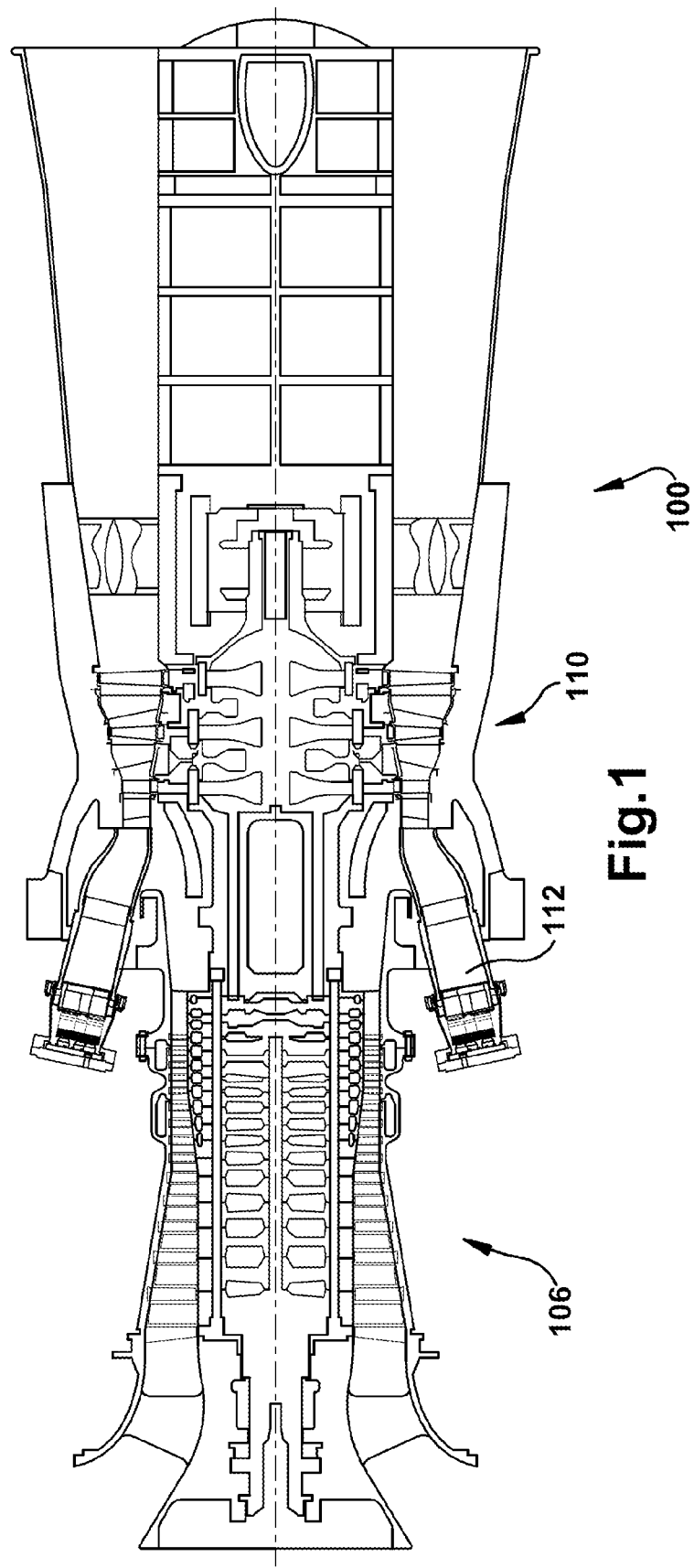
FIG. 1 is a schematic representation of an exemplary turbine engine in which certain embodiments of the present application may be used.

Referring now to the figures, FIG. 1 illustrates a schematic representation of a gas turbine engine 100, which will be used to describe an exemplary environment in which the present invention may be employed. It will be understood by those skilled in the art that the present invention is not limited to this type of usage. As stated, the present invention may be used in other types of gas turbine engines. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustor 112 positioned between the compressor 106 and the turbine 110.

Figure 2:
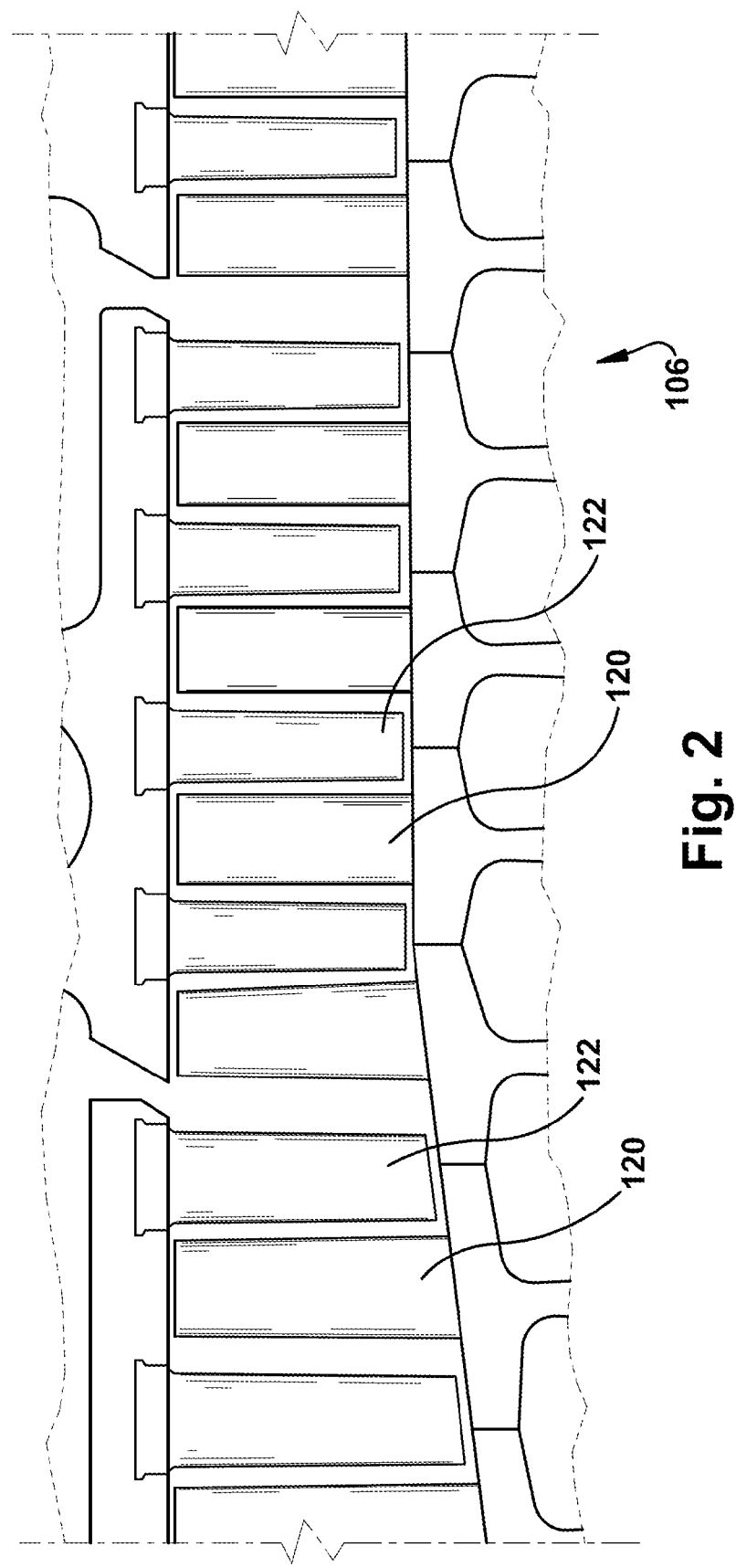
FIG. 2 is a sectional view of the compressor section of the gas turbine engine of FIG. 1.

FIG. 2 illustrates a view of an exemplary multi-staged axial compressor 106 that may be used in the gas turbine engine of FIG. 1. As shown, the compressor 106 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor rotor blades 120 are circumferentially spaced and attached to the shaft; when the shaft rotates during operation, the compressor rotor blades 120 rotate about it. As one of ordinary skill in the art will appreciate, the compressor rotor blades 120 are configured such that, when spun about the shaft, they impart kinetic energy to the air or fluid flowing through the compressor 106. The compressor 106 may have other stages beyond the stages that are illustrated in FIG. 2. Additional stages may include a plurality of circumferential spaced compressor rotor blades 120 followed by a plurality of circumferentially spaced compressor stator blades 122.

Figure 3:
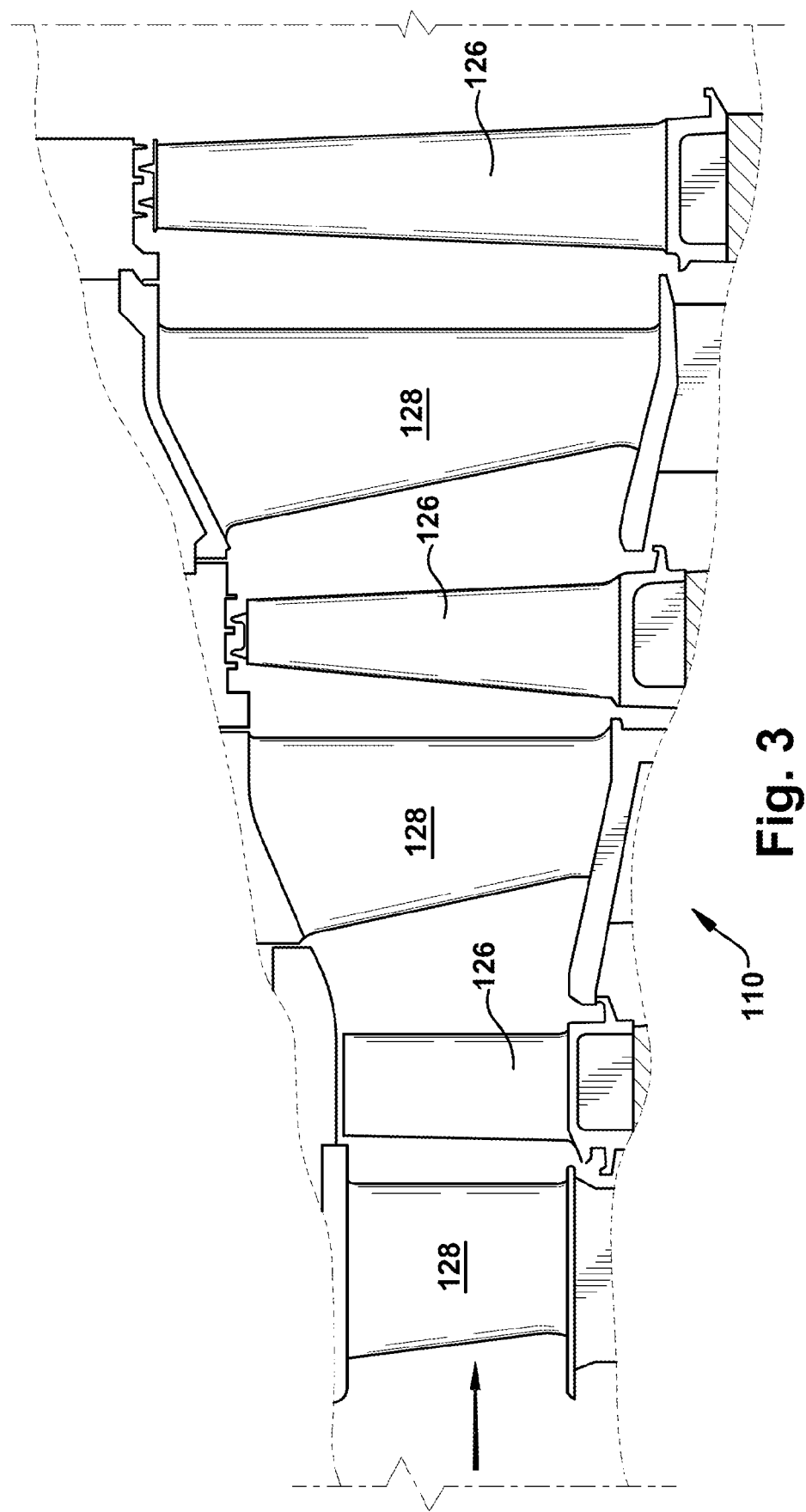
FIG. 3 is a sectional view of the turbine section of the gas turbine engine of FIG. 1.

FIG. 3 illustrates a partial view of an exemplary turbine section or turbine 110 that may be used in the gas turbine engine of FIG. 1. The turbine 110 also may include a plurality of stages. Three exemplary stages are illustrated, but more or less stages may present in the turbine 110. A first stage includes a plurality of turbine buckets or turbine rotor blades 126, which rotate about the shaft during operation, and a plurality of nozzles or turbine stator blades 128, which remain stationary during operation. The turbine stator blades 128 generally are circumferentially spaced one from the other and fixed about the axis of rotation. The turbine rotor blades 126 may be mounted on a turbine wheel (not shown) for rotation about the shaft (not shown). A second stage of the turbine 110 also is illustrated. The second stage similarly includes a plurality of circumferentially spaced turbine stator blades 128 followed by a plurality of circumferentially spaced turbine rotor blades 126, which are also mounted on a turbine wheel for rotation. A third stage also is illustrated, and similarly includes a plurality of turbine stator blades 128 and rotor blades 126. It will be appreciated that the turbine stator blades 128 and turbine rotor blades 126 lie in the hot gas path of the turbine 10. The direction of flow of the hot gases through the hot gas path is indicated by the arrow. As one of ordinary skill in the art will appreciate, the turbine 110 may have other stages beyond the stages that are illustrated in FIG. 3. Each additional stage may include a row of turbine stator blades 128 followed by a row of turbine rotor blades 126.

In use, the rotation of compressor rotor blades 120 within the axial compressor 106 may compress a flow of air. In the combustor 112, energy may be released when the compressed air is mixed with a fuel and ignited. The resulting flow of hot gases from the combustor 112, which may be referred to as the working fluid, is then directed over the turbine rotor blades 126, the flow of working fluid inducing the rotation of the turbine rotor blades 126 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 120, such that the necessary supply of compressed air is produced, and also, for example, a generator to produce electricity.

Before proceeding further, note that in order to communicate clearly the invention of the current application, it may be necessary to select terminology that refers to and describes certain machine components or parts of a turbine engine. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often certain components may be referred to with several different names. In addition, what may be described herein as a single part may include and be referenced in another context as consisting of several component parts, or, what may be described herein as including multiple component parts may be fashioned into and, in some cases, referred to as a single part. As such, in understanding the scope of the invention described herein, attention should not only be paid to the terminology and description provided, but also to the structure, configuration, function, and/or usage of the component as described herein.

In addition, several descriptive terms that are common to turbine engine applications may be used herein. The definitions for these terms are as follows. The term "rotor blade", without further specificity, is a reference to the rotating blades of either the compressor 106 or the turbine 110, which include both compressor rotor blades 120 and turbine rotor blades 126. The term "stator blade", without further specificity, is a reference the stationary blades of either the compressor 106 or the turbine 110, which include both compressor stator blades 122 and turbine stator blades 128. The term "blades" will be used herein to refer to either type of blade. Thus, without further specificity, the term "blades" is inclusive to all type of turbine engine blades, including compressor rotor blades 120, compressor stator blades 122, turbine rotor blades 126, and turbine stator blades 128. Further, as used herein, "downstream" and "upstream" are terms that indicate a direction relative to the flow of working fluid through the turbine. As such, the term "downstream" means the direction of the flow, and the term "upstream" means in the opposite direction of the flow through the turbine. Related to these terms, the terms "aft" and/or "trailing edge" refer to the downstream direction, the downstream end and/or in the direction of the downstream end of the component being described. And, the terms "forward" or "leading edge" refer to the upstream direction, the upstream end and/or in the direction of the upstream end of the component being described. The term "radial" refers to movement or position perpendicular to an axis. It is often required to describe parts that are at differing radial positions with regard to an axis. In this case, if a first component resides closer to the axis than a second component, it may be stated herein that the first component is "inboard" or "radially inward" of the second component. If, on the other hand, the first component resides further from the axis than the second component, it may be stated herein that the first component is "outboard" or "radially outward" of the second component. The term "axial" refers to movement or position parallel to an axis. And, the term "circumferential" refers to movement or position around an axis.

Figure 4:
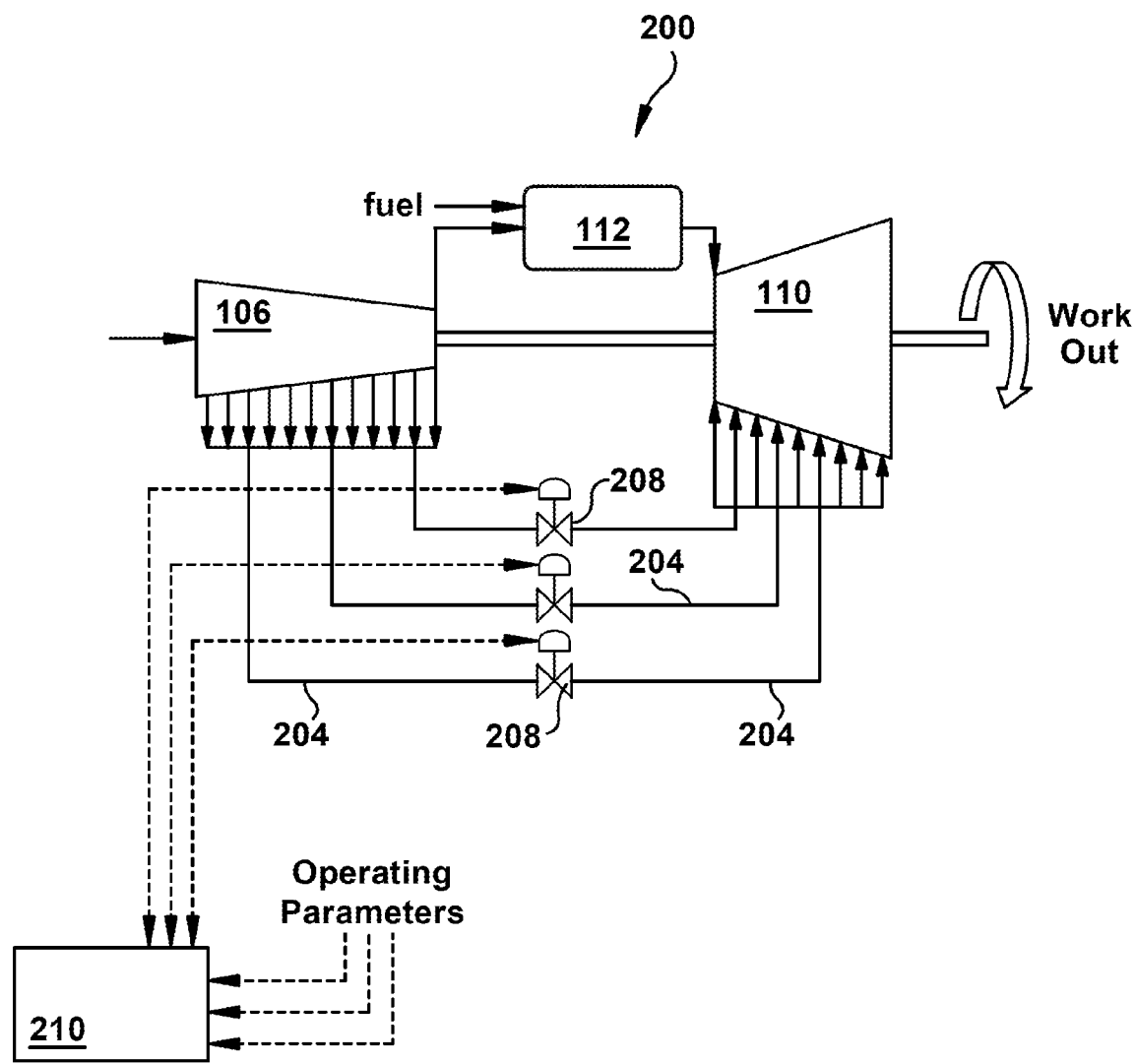
FIG. 4 is a schematic representation of a turbine system according to exemplary embodiments of the present application.

Referring again to the figures, FIG. 4 illustrates an exemplary embodiment of the present invention: a turbine system 200. As will be described in more detail, apparatus, methods, and/or systems are provided that utilize variable compressor extraction and model-based control for the purpose of improving operation of a combustion or gas turbine engine. As used herein, "variable compressor extraction" is defined as the ability to control the amount of airflow being extracted from the compressor section of a gas turbine. At minimum, "variable compressor extraction" includes the ability to provide at least two different levels of airflow extraction. As used herein, "model-based control" is a method of controlling a turbine engine based upon a model of engine operation. As such, a turbine engine may be controlled not only on measured operating parameters, but also on operating parameters that may be calculated given the turbine engine model and the measured operating parameters. As discussed in more detail below, the present application provides enhanced operational performance through, among other things, the integration of variable compressor extraction and model-based control. It will be appreciated that certain exemplary embodiments of the present invention utilize existing compressor extraction piping or supply lines and a conventional variable extraction valve or orifice installed within the existing pipe. The control of the variable extraction orifice, as described in more detail below, may be based on engine operating parameters measured, monitored, and/or calculated by a control unit pursuant to a conventional model-based control program or system that has been modified to operate pursuant to the process steps detailed herein. In this manner, engine performance may be enhanced by taking better advantage of variable compressor extraction and available cooling flow levels through the use of model-based control. More particularly, as discussed in more detail below, the present invention may be used to increase or maximize engine output or increase or maximize efficiency.

As one of ordinary skill in the art will appreciate, compressor extraction may be provided in any compressor stage of a turbine system. The extracted flow may be supplied to the turbine section of the engine to cool parts and/or maintain the parts at appropriate temperatures during operation. As used herein, extracted flow is meant to refer to any supply of air that is extracted or bled from the compressor and fed to the turbine section of the engine to cool parts, purge cavities or other similar uses. Generally, the amount of air extracted in conventional systems is fixed. A conventional variable compressor extraction valve or orifice may be used to allow for a varying level of compressor air extraction.

Embodiments of the invention are described below with reference to block diagrams of systems, methods, apparatuses and/or computer program products according to an embodiment of the invention. Example embodiments of the invention are more fully described hereinafter with reference to the accompanying drawings, in which like numerals indicate like elements throughout the several drawings. Indeed, these inventions may be embodied in many different forms and should not be construed as limited to the embodiments set forth herein; rather, these embodiments are provided so that this disclosure will satisfy applicable legal requirements.

As stated, FIG. 4 illustrates an example turbine system 200 for using model-based control pursuant to the process provided herein to control extraction flows from the compressor 106 such that engine performance is enhanced for certain applications. The example turbine system 200 shown in FIG. 4 may be a gas turbine used for powering an electric generator (not shown). As shown in the example embodiment of FIG. 4, the turbine system 200 may include a compressor 106, a turbine 110, and a combustor 112, the general operation of which is described in more detail above.

As also shown, the turbine system 200 may include extraction supply lines or conduit 204 disposed in flow communication with an extraction point or stage of the compressor 106. The extraction conduit 204 general is the piping that carries extracted flows from the compressor 106 to the turbine 110. In some example embodiments of the invention, the extraction point in the compressor 106 may be located at stage 9 and/or stage 13, though extraction may occur at other stages. In accordance with some example embodiments of the present invention, the controlled variable extraction flows may be reinstated at any component in any stage of the turbine 110 for part cooling, cavity purge or other such similar functions, as one of ordinary skill in the art will appreciate. To allow for control and manipulation of the extraction flows during turbine engine operation, the extraction conduit 204 may be connected to or include one or more variable extraction orifices 208. As shown in the illustrated embodiment of FIG. 4, from the variable extraction orifices 208, extraction conduits 204 may continue and direct the extracted flow to a desired location within the turbine 110.

In example embodiments of the invention, the variable extraction orifices 208 may include of one or more variable geometry orifices. The geometry of each orifice 208 may be controlled in accordance with one or more turbine operating parameters of the engine. As discussed in more detail below, the orifices 208 may control the level of extraction flows to maintain a certain desired operating characteristics. In example embodiments of the invention, the variable extraction orifices 208 may be installed in existing or conventional extraction conduit 204. In an example embodiment of the invention, one or more variable extraction orifices 208 may be operated to define at least a relatively low flow orifice setting, a high flow orifice setting and/or other settings. A control unit 210 may control the settings of the one or more variable extraction orifices 208 such that these settings may be achieved as desired by a system operator for the turbine system 200. An example variable extraction orifice may be a valve (e.g., a hydraulic globe valve, pneumatic valve, gate valve, etc.), where the stroke of the valve may be controlled by the control unit 210 per conventional means.

As one of ordinary skill in the art will appreciate, the control unit 210 may perform many functions including fuel, air and emissions control, sequencing of turbine fuel and auxiliary for start-up, shut-down and cool-down, synchronization and voltage matching of generator and system, monitoring of all turbine, control and auxiliary functions, monitoring of all turbine operating parameters, protection against unsafe and adverse operating conditions, and/or other similar functions. In some example embodiments of the present invention, the control unit 210 and the manner in which it controls and manipulates extraction flows may be incorporated into a conventional or existing multi-parameter turbine engine control system (e.g., existing model-based control systems or corrected parameter control systems). In an example embodiment of the invention, the control unit 210 for a gas turbine system may be a component and/or module incorporated into existing turbine control systems such as, but not limited to, the General Electric Co.'s Speedtronic™ Mark VI Control System. As one of ordinary skill in the art will appreciate, the aspects of the present invention that include measuring, monitoring, calculating, and controlling turbine engine operating parameters and operation, including the necessary sensors and computer-activated mechanisms (for example, the variable extraction orifices 208), may be found in one or more of these conventional systems, which may be modified to function in accordance with the invention described herein.

As shown in FIG. 4, example embodiments of the invention utilize an integrated control unit 210 to provide active modulation of extraction flows during operation by controlling one or more variable extraction orifices 208. The control unit 210 is capable of controlling extraction flows in response to one or more measured or calculated engine operating parameters relating to the various components of turbine system 200. Thus, in accordance with an exemplary embodiment of the invention, one or more operating parameters relating to turbine system 200 may be measured by the control unit 210 via conventional sensors disposed in one or more locations in the turbine system 200. The sensors may be placed throughout the various components and/or stages of the turbine system 200, including the compressor 106, combustor 112, turbine 110, the variable extraction orifices 208, extraction conduits 204, and others, and may transmit information to the control unit 210 as necessary. The sensors, as one of ordinary skill in the art will appreciate, may take measurements relating to valve positions, temperature, pressure, and other such measurements, as provided below. Conventional turbine engine sensors may be used in closed loop control systems. The control unit 210 then monitor and record the measured information from the sensors (note that the sensors may be considered part of the control unit 210). The control unit 210 may use the obtained data from the sensors to make calculations relating to operating parameters that were not measured by a sensor, such as, for example, fire temperature. These calculations may be based on conventional model-based control systems or other similar methods. The control unit 210, as discussed below, may use these calculations and the collected data to modulate extraction flows to enhance turbine engine operation.

More particularly, per exemplary embodiments of the present application, the operating parameters measured, monitored, and recorded by the control unit 210 of turbine system 200 may include: turbine exhaust temperature and/or pressure, compressor airflow, compressor inlet temperature, compressor outlet temperatures, compressor inlet pressure, compressor outlet pressure, fuel flow, combustion dynamics, distribution and intake air-flow, and/or others as provided below. In some example embodiments of the present invention, the control unit 210 may calculate, monitor, and record one or more operating parameters (e.g., combustor exit temperature, turbine reference temperature, turbine firing temperature, etc.) based on measured engine operating parameters. As provided herein, the control unit 210 may control the variable extraction orifice 208 pursuant to any and all of these measured, monitored, recorded, and/or calculated engine operating parameters (i.e., data concerning how the engine is operating and the conditions under which it operates).

The turbine system 200 shown in and described with respect to FIG. 4 is provided by way of example only. Numerous other turbine system operating environments, architectures, and/or configurations are possible. Accordingly, embodiments of the invention should not be construed as being limited to any particular operating environment, architecture, or configuration shown in and described with respect to FIG. 4. A more detailed description of the operations for controlling compressor extraction flows from a compressor of a turbine system consistent with embodiments of the present application is provided below with reference to FIGS. 5 and 6.

Figure 5:
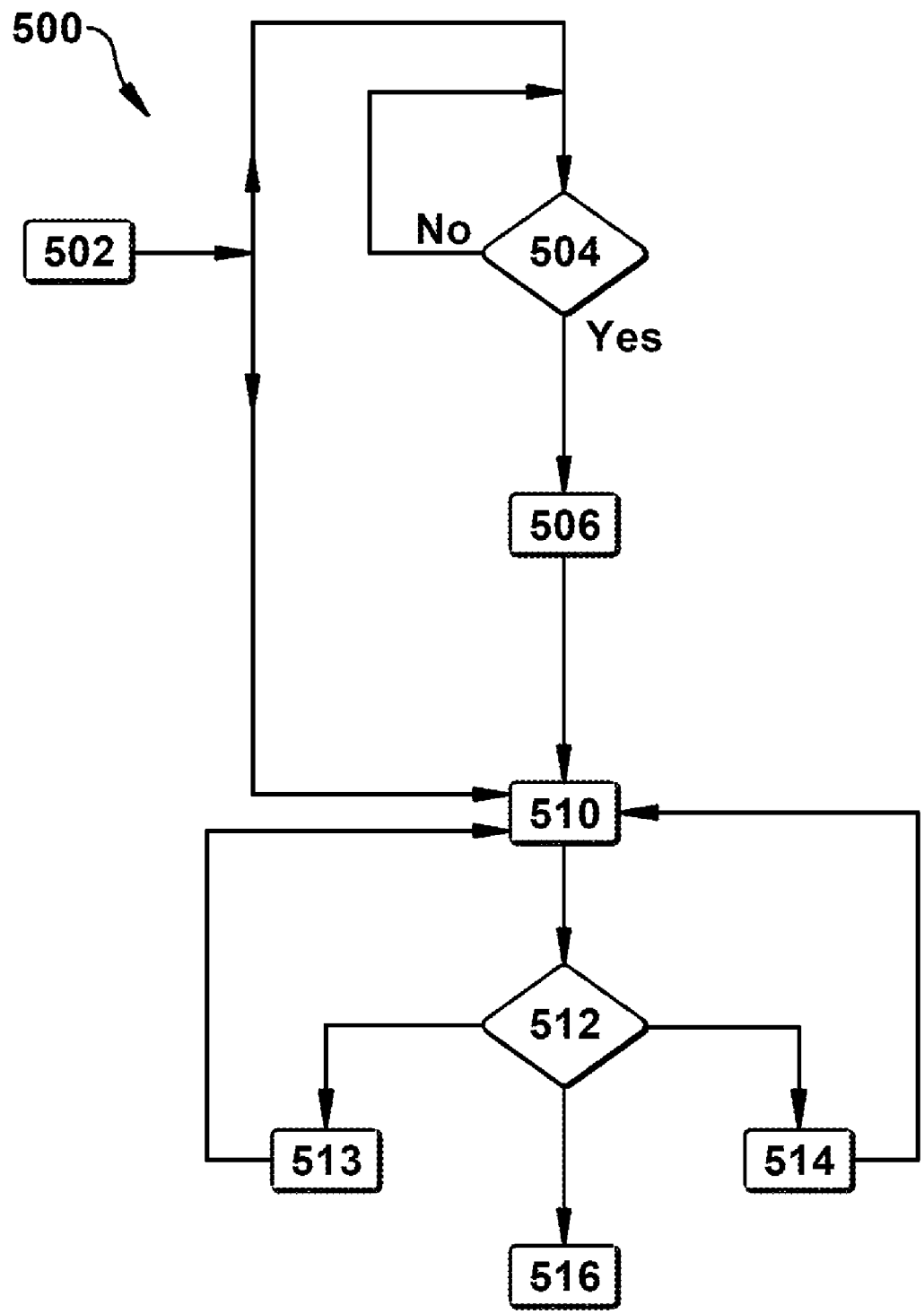
FIG. 5 is a flow diagram illustrating the operation of an exemplary embodiment of the present application.
Figure 6:
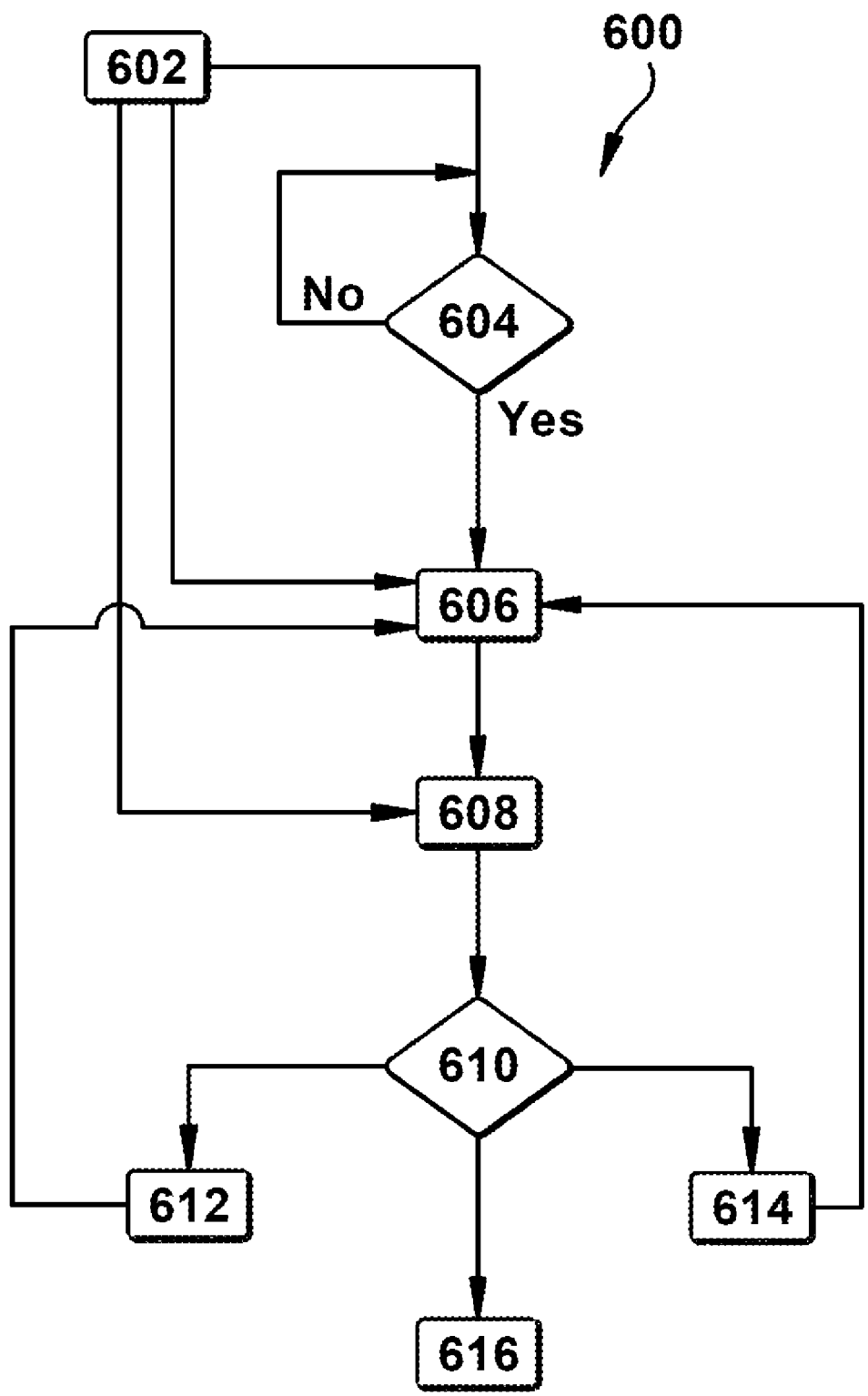
FIG. 6 is a flow diagram illustrating the operation of an exemplary embodiment of the present application.

FIGS. 5 and 6 illustrate an example flowchart for controlling extraction air flows from a compressor of a turbine system in accordance with an embodiment of the invention. It will be understood that one or more blocks and/or combinations of blocks in FIGS. 5 and 6 can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below. These computer program instructions may also be stored in a computer-readable memory that can direct a computer or other programmable data processing apparatus to function in a particular manner including implementing the functions specified in the block or blocks. Embodiments of the invention may also be implemented through an application program running on an operating system of a computer. In addition, or in the alternative, the application program (in whole or in part) may be located in remote memory or in storage to allow for the practice of embodiments of the invention where tasks are performed by remote processing devices linked through a communications network.

It will also be understood that each block and/or combinations of blocks in FIGS. 5 and 6 can be implemented by special purpose hardware-based computer systems that perform the specified functions or elements, or combinations of special purpose hardware and computer instructions. These embodiments also may be practiced with other computer system configurations, including hand-held devices, multiprocessor systems, microprocessor based or programmable consumer electronics, mini-computers, mainframe computers, etc.

The exemplary embodiment represented by FIG. 5 relates a method for increasing and/or maximizing turbine output. This method may be implements through the use of conventional model-based control systems and variable extraction. One aspect of this exemplary embodiment is that the turbine engine may increase its output. This may be done through operating the engine at temperatures that may be beyond previously accepted upper limits by using the variable extraction to maximize the extraction of air from the compressor and, then, given the extraction flows, reformulating upper temperature limits. This type of operation, for example, may provide operators the flexibility to increase output on hot days during peak demand.

As shown in FIG. 5, an example process 500 may begin at Block 502, where one or more turbine engine operating parameters are monitored by the control unit 210. As stated, the use of sensors allows for a variety of measured and/or calculated turbine operating parameter to be recorded and/or monitored by the control unit 210. Accordingly, at Block 502, the process may measure, calculate, record and/or monitor one or more turbine operating parameters, including one or more of the following:
 a) extraction conduit 204 pressure for one or more of the extraction conduits 204 (This measurement may be measured via a pressure transducer positioned downstream of the variable extraction orifices.);
 b) extraction flow level (This may be calculated, for example, given the known dimensions of the extraction conduits 204 and the measured pressure in the extraction conduits 204.);
 c) the settings of the variable extraction orifices 208;
 d) compressor exit pressure;
 e) ambient conditions;
 f) turbine inlet temperature ("Tfire") (Tfire may be calculated given the measured gas turbine exhaust temperature and other measured parameters.);
 g) gas turbine output/load level; and
 h) gas turbine exhaust temperature.

Unless otherwise stated, the measuring, calculating, recording and/or monitoring of the turbine operating parameters may be done per conventional means and methods. Other operating parameters also may be monitored. The monitoring of Block 502 may be updated continuously or periodically and the updated data may be used by other steps in the process, as indicated in the flow diagram.

At Block 504, the process may determine whether the system operator wants to increase engine output and/or maximize engine output? If it is determined that the system operator wants to increase engine output and/or maximize engine output, the process may continue to Block 506. If it is determined that the system operator does not want to increase engine output and/or maximize engine output, the process may end or repeat Block 504. (Note that, in a preferred alternative embodiment, the determination as to whether the system operator wants to increase and/or maximize engine output may be accomplished automatically and without current or additional input from the system operator. That is, the process may automatically increase and/or maximize engine output if certain conditions are satisfied. A system operator, which may be any decision maker that is controlling the operation of the turbine engine, may specify these conditions. In some instances, these conditions may include such factors as ambient conditions and electricity rates during peak demand. In this manner, for example, the system operator or other decision maker may decide when it is cost-effective to increase or maximize engine output beyond a base load level and may create rules that allow for it to happen automatically.)

At Block 506, the process may set the variable extraction orifices 208 to a more or substantially fully-opened setting (i.e., the setting that allows the approximate highest level of extraction flow to flow from the compressor to the turbine). If the variable extraction orifices 208 are already set to the fully-opened setting, the process may return to Block 504 with no action taken or, in some embodiments, may proceed to Block 510.

At Block 510 and/or the subsequent Blocks, the process generally applies to the control mechanism that controls the flow of fuel to the combustor and/or the level combustion engine output. For example, the process may measure and/or calculate Tfire current, which represents the current turbine inlet temperature, and Tfire max, which represents the maximum turbine inlet temperature at which the turbine engine may operate based on the temperature limits of hot-gas path parts and the level of extraction (i.e., the amount of cooling air available to cool the hot-gas path parts). Tfire current and Tfire max may be calculated using a model-based control approach given the most current measured turbine operating parameters described in Block 502, including any change in the measured turbine operating parameters that occur due to setting the variable extraction orifices 208 to a more or substantially fully-opened setting (per the operation of Block 506) and/or the increase or decrease in the supply of fuel to the combustor that may have resulted from the operation of Blocks 513 and 514 (as discussed below). As one of ordinary skill in the art will appreciate, the determination by the model-based control system of Tfire current may be calculated based in large part on, for example, measured operating parameters such as turbine exhaust temperature data, ambient conditions data, and/or the compressor pressure ratio data. As one of ordinary skill in the art will appreciate, the determination by the model-based control system of Tfire max may be calculated based in large part on, for example, the models prediction of operating parameters at elevated Tfire temperatures, including, for example, the level of extraction flow level given the new setting, and the temperature limitations of components within the hot-gas path. The model-based control approach used for these calculations may comprise, for example, turbine operating control systems such as MBC Full Load Cycle Control, the ARES model, and other similar control systems.

At Block 512, the process may compare the calculated values for Tfire current and Tfire max. If Tfire max exceeds Tfire current by a predetermined amount, the process may return to Block 513, where the fuel supply to the combustor may be increased. If Tfire current exceeds Tfire max by a predetermined amount, the process may proceed to Block 514, where the fuel supply to the combustor may be decreased. If Tfire max and Tfire current are substantially equal or within a predetermined range of each other, the process 500 may be said to have determined an approximate maximum level of fuel supply to the combustor and/or a maximum level of output. If this is the case, the process 500 may proceed to Block 516.

At Block 513, the process may increase the supply of fuel to the combustor. The process may then continue to Block 510.

At Block 514, the process, as described, may decrease the supply of fuel to the combustor. The process may then continue to Block 510.

At Block 516, the process may end, as shown, or may return to Block 502. In this manner, the process 500, in operation, may allow turbine systems to increase and/or maximize output through the use of model-based control and variable extraction.

FIG. 6 illustrates another exemplary embodiment of the present invention, a process 600. The embodiment represented in FIG. 6 relates to increasing turbine engine efficiency and/or optimizing turbine efficiency through the use of model-based control and variable extraction. As described in more detail below, this aspect of the current invention, for example, may allow a system operator to cut extraction flows that are unnecessarily too high while operating at a base load or part load level such that the engine operates more efficiently. As stated, the use of sensors allows for a variety of measured and/or calculated turbine operating parameter to be recorded and/or monitored by the control unit 210. Accordingly, at Block 602, the process may measure, calculate, record and/or monitor one or more turbine operating parameters, including one or more of the following a) extraction conduit 204 pressure for one or more of the extraction conduits 204 (This measurement may be measured via a pressure transducer positioned downstream of the variable extraction orifices.);
b) extraction flow level (This may be calculated, for example, given the known dimensions of the extraction conduits 204 and the measured pressure in the extraction conduits 204.);
c) the settings of the variable extraction orifices 208;
d) compressor exit pressure;
e) ambient conditions;
f) turbine inlet temperature ("Tfire") (Tfire may be calculated given the measured gas turbine exhaust temperature and other measured parameters);
g) gas turbine output/load level; and
h) gas turbine exhaust temperature.

Unless otherwise stated, the measuring, calculating, recording and/or monitoring of the turbine operating parameters may be done per conventional means and methods. Other operating parameters also may be monitored. The monitoring of Block 602 may be updated continuously or periodically and the updated data may be used by other steps in the process, as indicated in the flow diagram.

At Block 604, the process may determine whether the system operator wants to decrease or minimize extraction flow levels such that engine efficiency is increased and/or optimized. (Note that, in a preferred alternative embodiment, the process may automatically reduce or minimize extraction flow levels such that efficiency is enhanced or optimized during most operating conditions, i.e., during all or most base load or part load levels, without receiving input from the system operator. That is, in such an embodiment, operation pursuant to the other steps of process 600 may be the default control scheme so that the engine operates at a reduced or minimized extraction flow level during most operating conditions.) If it is determined at Block 604 that the system operator wants to decrease the extraction flow level such that engine efficiency is increased and/or optimized, the process may continue to Block 606. If it is determined that the system operator does not want to decrease the extraction flow level such that engine efficiency is increase and/or optimized, the process may repeat Block 604.

At Block 606, the process may calculate a measured critical pressure ratio. As one of ordinary skill in the art will appreciate the measured critical pressure ratio is the pressure ratio across the extraction conduit 204, i.e., the ratio of the pressure within the extraction conduit to the pressure at the exit of the compressor 106. The measured pressure level in the extraction conduit 204 may be measured via a pressure transducer positioned downstream of the variable extraction orifice 208. The pressure level at the exit of the compressor 106 may be measured via conventional means at the exit of the compressor 106. In cases where more than one extraction conduit 204 is present, for example, in a system that has extraction conduit 204 that extracts compressor air from the 9th and 13th stage of the compressor, a value for the measured critical pressure ratio may be calculated for each extraction conduit 204.

At Block 608, the process may determine a scheduled critical pressure ratio. As one of ordinary skill in the art will appreciate, the scheduled critical pressure ratio is a predetermined value or limit established by the specifications of hot-gas path components. The schedule critical pressure level identifies the threshold beyond which the hot-gas path components are not adequately cooled, may overheat or compromise part life. More specifically, in some instances, the determination of the scheduled critical pressure ratio generally may include three operational characteristics associated with providing an adequate extraction flow (i.e., coolant) to hot-gas path parts. These operational characteristics may include back flow margin, wheelspace temperature measurements (which may indicate adequate wheelspace purge flow), and actual metal temperatures in the hot-gas path. In general, operating the turbine engine such that the value of the measured critical pressure ratio remains less than the scheduled critical pressure ratio ensures that hot-gas path components are operating within acceptable temperatures. As one of ordinary skill in the art will appreciate, the scheduled critical pressure ration may be a single value or a schedule of values that is dependant on the current load setting, ambient conditions and/or other factors.

At Block 610, the process may compare the measured critical pressure ratio from Block 606 to the scheduled critical pressure ratio from Block 608 for one or all of the extraction conduits 204. If it is determined that the measured critical pressure ratio exceeds the scheduled critical pressure ratio by a predetermined amount, the process may proceed to Block 614. If it is determined that the scheduled critical pressure ratio exceeds the measured critical pressure ratio by a predetermined amount, the process may proceed to Block 612. If it is determined that the measured critical pressure ratio and scheduled critical pressure ratio are substantially equal or within a predetermined range of each other, the process may proceed to Block 616.

At Block 612, the process may set the variable extraction orifices to a setting that reduces the extraction flow that flows from the compressor 106 to the turbine 110, i.e., set the variable extraction orifices to a more closed position. This may be done because the scheduled critical pressure ratio exceeding the measured critical pressure ratio by a predetermined amount may indicate that excess coolant is being extracted from the compressor. The process may then proceed to Block 606.

At Block 614, the process may set the variable extraction orifices to a setting that increases the extraction flow that flows from the compressor 106 to the turbine 110, i.e., set the variable extraction orifices to a more open position. This may be necessary because the measured critical pressure ratio exceeding the scheduled critical pressure ratio by a predetermined amount may indicate that not enough coolant is being extracted from the compressor. The process may then proceed to Block 606.

At Block 616, the process may end, as shown, or may return to Block 602. In operation, as one of ordinary skill in the art will appreciate, process 600 allows a system operator to cut unnecessary extraction flow such that the efficiency of the turbine engine may be increased and/or maximized.

The example process elements of FIGS. 5 and 6 are shown by way of example, and other process and flow embodiments can have fewer or greater numbers of elements, and such elements can be arranged in alternative configurations in accordance with other embodiments of the invention. Example embodiments of the invention may provide the technical effects of improving and/or maximizing the output and/or efficiency of a combustion turbine engine by utilizing variable extraction flows (via one or more variable extraction orifices) and model-based control system.

In addition, in accordance with an alternative embodiment of the present invention, the process steps of FIGS. 5 and 6, as one of ordinary skill will appreciate, may be combined into a combined/single process. In one example of this type of embodiment, for example, the process may automatically reduce or minimize extraction flow levels pursuant to the process of FIG. 6 such that efficiency is enhanced or optimized during most operating conditions (i.e., during all or most base load or part load levels, without receiving input from the system operator). Upon receiving input from the system operator (or, as described, automatically upon the fulfilling of certain specified conditions), the process may increase or maximize output at increased or maximized extraction flow levels.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each possible iteration is not herein discussed in detail, though all combinations and possible embodiments embraced by the several claims below are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. A method of controlling variable extraction flow in a turbine engine that includes a compressor, a combustor and a turbine, wherein extraction flow comprises a supply of compressed air extracted from the compressor and supplied to the turbine while bypassing the combustor through one or more extraction conduits, and wherein at least one of the extraction conduits includes a variable extraction orifice that has a plurality of settings controlled by a control unit, the method comprising the steps of:

measuring a plurality of turbine engine operating parameters, wherein the measured operating parameters include at least one associated with a temperature within the turbine, one associated with the setting of the variable extraction orifice, one associated with the level of extraction flow; one associated with a supply of fuel to the combustor;

monitoring, by the control unit, the measured operating parameters of the combustion turbine engine;

setting at least one variable extraction orifice to a setting that allows an approximate maximum level of extraction flow;

calculating, by the control unit, at least one calculated operating parameter based upon model-based control and the measured operating parameters, including at least a current turbine inlet temperature and a maximum turbine inlet temperature;

manipulating the setting for the supply of fuel to the combustor such that an increased and/or approximate maximum level of engine output is determined by comparing the values for the current turbine inlet temperature and the maximum turbine inlet temperature;

determining if a system operator wants to increase and/or maximize engine output;

setting at least one of the variable extraction orifices to a setting that allows an approximate maximum level of extraction flow;

given any changes in the measured operating parameters that result from the setting that allows an approximate maximum level of extraction flow for the at least one variable extraction orifice, calculating the current turbine inlet temperature and the maximum turbine inlet temperature, wherein the calculation of the maximum turbine inlet temperature is based upon an approximate maximum combustor exit temperature at which the turbine engine may operate given the temperature limits of hot-gas path parts and the approximate level of extraction flow at the setting that allows an approximate maximum level of extraction flow for the at least one variable extraction orifice; and comparing the current turbine inlet temperature and the maximum turbine inlet temperature.

2. The method of claim 1, wherein the current turbine inlet temperature comprises a current turbine inlet temperature, and the maximum turbine inlet temperature comprises the approximate maximum turbine inlet temperature that the turbine engine may operate at given the temperature limits of hot-gas path parts and the level of extraction flow.

3. The method of claim 1, wherein:

variable extraction flow comprises extraction flow levels that vary depending on the setting of the variable extraction orifice; and the variable extraction orifice has at least two discreet settings, which include a less open setting in which a reduced level of extraction flow is allowed through the variable extraction orifice and a more open setting in which an increased level of extraction flow is allowed through the variable extraction orifice.

4. The method of claim 1, wherein model-based control comprises a method of controlling a turbine engine based upon a computer-implemented model of the operation of the turbine engine, wherein the control of the turbine engine is based upon a plurality of measured operating parameters and calculated operating parameters, the calculated operating parameters being calculated based upon the computer-implemented model of operation and the measured operating parameters.

5. The method of claim 1, wherein at least a portion of the extracted flow is supplied to hot-gas path parts in the turbine such that the extracted flow cools the parts during operation.

6. The method of claim 1, wherein:

the measuring of measured operating parameters is completed by a plurality of sensors, the plurality of sensors including at least one pressure transducer disposed downstream of the variable extraction orifice; and the sensors collect operating parameters data and transmit the operating parameters data to the control unit.

7. The method of claim 1, further comprising the steps of:
if it is determined that the current turbine inlet temperature exceeds the maximum turbine inlet temperature by a predetermined amount, decreasing the supply of fuel to the combustor; and
if it is determined that the maximum turbine inlet temperature exceeds the current turbine inlet temperature by a predetermined amount, increasing the supply of fuel to the combustor.

8. The method of claim 7, wherein the steps of the method are repeated until the approximate maximum level of engine output is determined, wherein the approximate maximum level of engine output occurs when the supply of fuel to the combustor at which the current turbine inlet temperature is approximately equal to the maximum turbine inlet temperature.

9. The method of claim 1, wherein the step of manipulating the setting for the supply of fuel to the combustor such that an increased and/or approximate maximum level of engine output is determined by comparing the values for the current turbine inlet temperature and the maximum turbine inlet temperature comprises: manipulating the setting for the supply of fuel to the combustor such that an approximate maximum level of engine output is determined by comparing the values for the current turbine inlet temperature and the maximum turbine inlet temperature.

* * * * *

UNITED STATES PATENT AND TRADEMARK OFFICE
CERTIFICATE OF CORRECTION

PATENT NO. : 8,355,854 B2  
APPLICATION NO. : 12/437730  
DATED : January 15, 2013  
INVENTOR(S) : Childers Page 1 of 1

It is certified that error appears in the above-identified patent and that said Letters Patent is hereby corrected as shown below:

In the Specification

In Column 2, Line 26, delete "of" and insert -- of: --, therefor.

In Column 4, Line 26, delete "10." and insert -- 110. --, therefor.

In Column 11, Line 20, delete "following" and insert -- following: --, therefor.

In Column 11, Line 34, delete "parameters);" and insert -- parameters.); --, therefor.

Signed and Sealed this
Twenty-fifth Day of June, 2013

Teresa Stanek Rea
*Acting Director of the United States Patent and Trademark Office*